(12) United States Patent
Rangasamy

(10) Patent No.: US 11,475,353 B2
(45) Date of Patent: Oct. 18, 2022

(54) AUTOMATED APPLICATION RELIABILITY MANAGEMENT USING ADAPTABLE MACHINE LEARNING MODELS

(71) Applicant: APPRANIX, INC., Holliston, MA (US)

(72) Inventor: Govindarajan Rangasamy, Holliston, MA (US)

(73) Assignee: APPRANIX, INC., Holliston, MA (US)

( * ) Notice: Subject to any disclaimer, the term of this patent is extended or adjusted under 35 U.S.C. 154(b) by 991 days.

(21) Appl. No.: 16/207,089

(22) Filed: Dec. 1, 2018

(65) Prior Publication Data

US 2019/0171966 A1 Jun. 6, 2019

Related U.S. Application Data

(60) Provisional application No. 62/593,275, filed on Dec. 1, 2017.

(51) Int. Cl.
| | |
|---|---|
| *G06N 20/00* | (2019.01) |
| *G06F 11/34* | (2006.01) |
| *G06F 11/30* | (2006.01) |
| *G06N 7/00* | (2006.01) |
| *H04L 67/10* | (2022.01) |

(52) U.S. Cl.
CPC ......... *G06N 20/00* (2019.01); *G06F 11/3003* (2013.01); *G06F 11/3476* (2013.01); *G06N 7/005* (2013.01); *G06F 11/3051* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 2016/0094483 A1* | 3/2016 | Johnston | G06F 8/65 709/226 |
| 2019/0050302 A1* | 2/2019 | Juniwal | G06F 3/0689 |
| 2019/0320329 A1* | 10/2019 | Gódor | H04L 41/5012 |

* cited by examiner

*Primary Examiner* — Anh Nguyen
(74) *Attorney, Agent, or Firm* — Prakash Nama; Global IP Services, PLLC

(57) ABSTRACT

Techniques for automated application reliability management using adaptable machine learning models are disclosed. In one example, a computer-implemented method may include identifying cloud components of an application deployed in a cloud service platform, determining relationships between the cloud components of the application and between the cloud components and other applications to generate a plurality of sub-assemblies, determining dependencies among the plurality of sub-assemblies to generate a super-assembly, generating infrastructure as code for application cloud components of the super-assembly and the plurality of sub-assemblies using metadata of the application cloud components, and performing a management operation to create a cloud infrastructure of the application using the generated infrastructure as code and verifying reliability of the created application using an adaptable machine learning model.

20 Claims, 12 Drawing Sheets

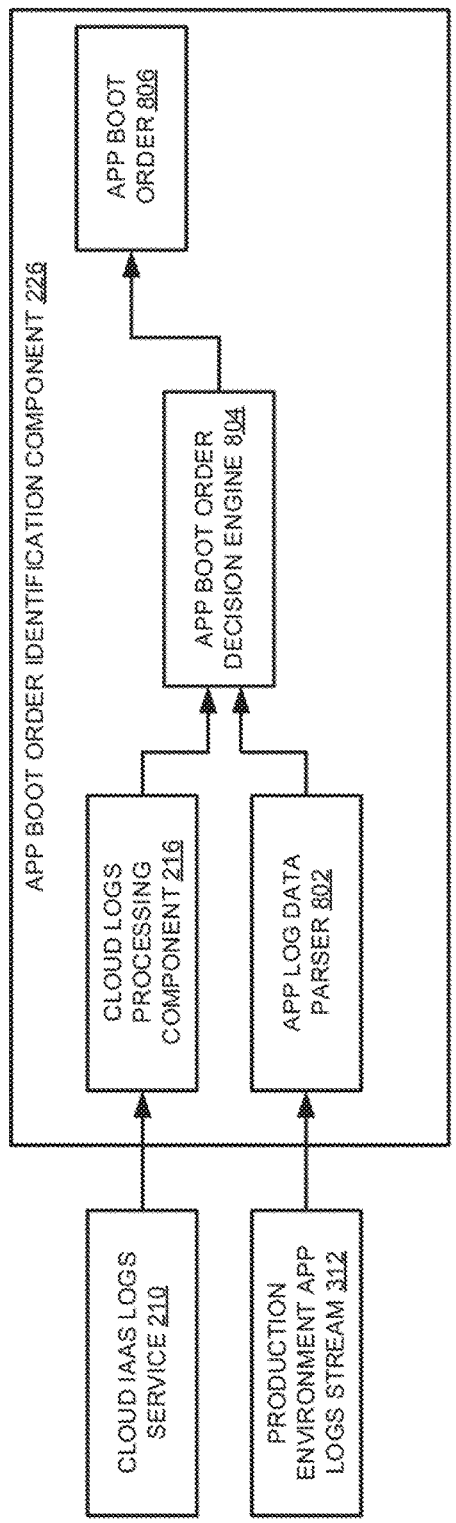

US 11,475,353 B2

AUTOMATED APPLICATION RELIABILITY MANAGEMENT USING ADAPTABLE MACHINE LEARNING MODELS

TECHNICAL FIELD

The present disclosure relates to computing environments, and more particularly to methods, techniques, and systems for automated management of application reliability using adaptable machine learning models in computing environments.

BACKGROUND

With increase in size and scale of businesses, software systems supporting digital transformation are prone to continuous changes. Such changes may require creating new applications and upgrading existing ones running on cloud service platforms. Along with creating/upgrading existing software applications, maintaining high reliability of such applications is imperative to any business. Currently, reliability of applications and services running on cloud service environments are managed manually by Site Reliability Engineers (SREs). SREs are specialists who work with software developers to ensure that an organization's computing systems are scalable, stable and predictable. SREs manage all aspects of an application's cloud infrastructure. SREs may need to continuously automate cloud infrastructure to ensure reliability of applications running on cloud. As the scale and complexity of applications increase, it becomes challenging for SREs to maintain the reliability of the applications. Moreover, events like natural disasters, ransomware attacks, the cloud service platform configuration may change and requires maintenance. Such events associated with the cloud service platforms may also affect the reliability of the applications running on the cloud.

BRIEF DESCRIPTION OF THE DRAWINGS

FIG. 8 is a block diagram of an example app boot order identification component of FIG. 2;

FIG. 9 is an example representation of an app signature used for training adaptable machine learning models;

Figure 1:
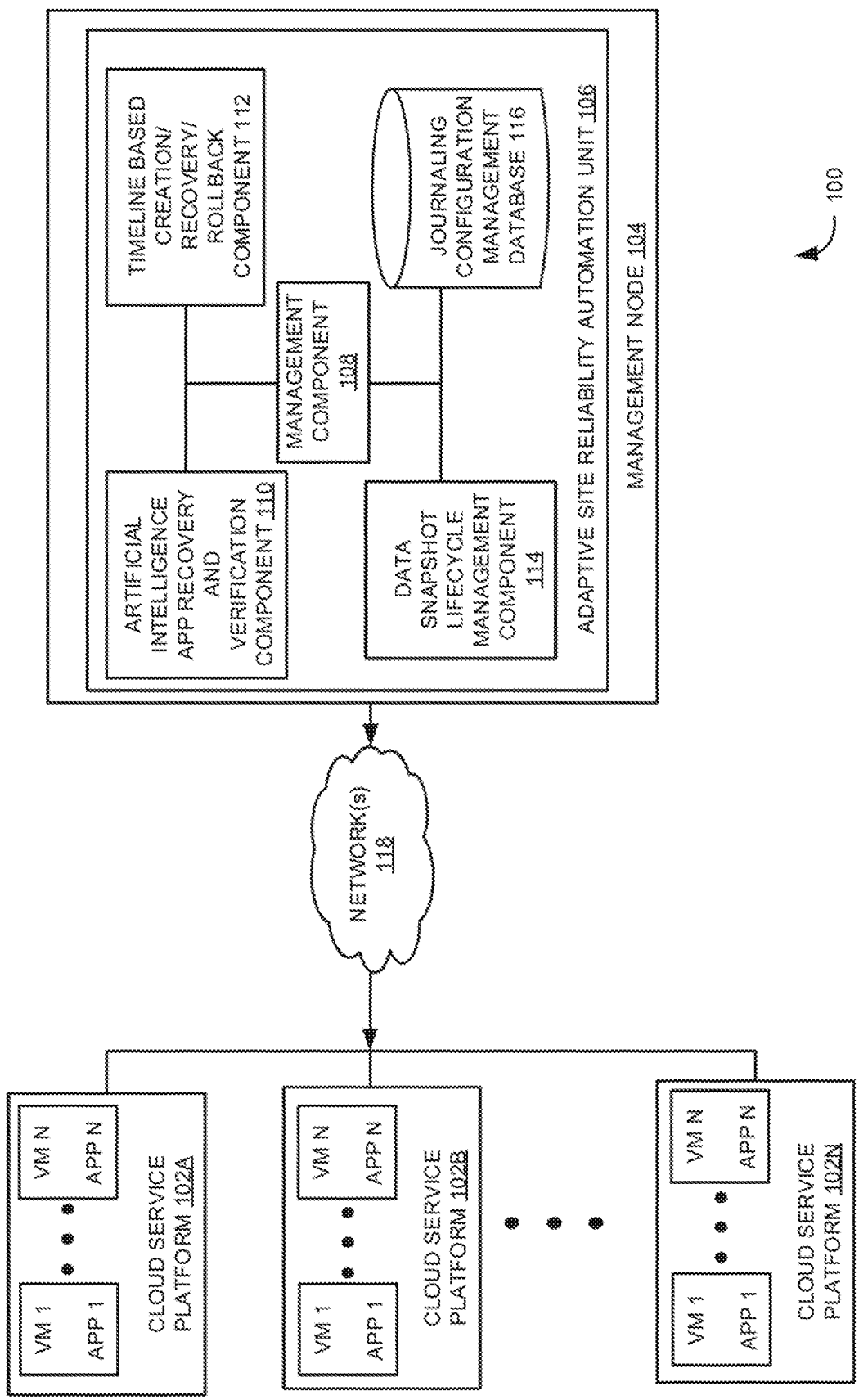
FIG. 1 is a system view of an example computing environment 100 illustrating a management node connected to cloud service platforms to manage reliability of an application in a cloud service platform.

The drawings described herein are for illustration purposes only and are not intended to limit the scope of the present subject matter in any way.

DETAILED DESCRIPTION

Embodiments described herein may provide an enhanced computer-based and network-based method, technique, and system for managing reliability of an application in a computing environment using an adaptable machine learning model. The computing environment may be a networked computing environment such as an enterprise computing environment, a cloud computing environment, a virtualized environment, a cross-cloud computing environment, or the like. Managing reliability of the application in a computing environment may include automatically performing operations related to a Site Reliability Engineering using adaptive machine learning models. Managing reliability may include automating IT operations such as self-healing, cloning, migrating, and recovering applications in the computing environment. Examples described herein may include various sub-systems that may or may not be necessary and may be assembled as needed for any given requirement. The terms "computing environments", "cloud service", "cloud platforms", and "cloud service platforms" may be used interchangeably throughout this document. The terms "software development environments", "application development environments", and "software factories" may be used interchangeably throughout this document.

A complex business software may comprise many layers including a set of components in cloud infrastructure configured to run stateless components. These components may rely on or are connected to a set of stateful components running on a different computing environment other than the public cloud infrastructures. Typically, all the components in a business software system run on cloud service platforms. These environments may not be linked together. For example, some environments may run the production where the main users of the business application may connect and make use of the business software system. Other environments may be used to produce the primary business software system. There may be many such environments for every development and test group that handle a component, a micro-service, or the entire business system.

Currently, there is no effective way to monitor and manage the environments that are used to produce components of the business software system in a connected way that is analogues to a traditional manufacturing model in a factory. For example, in a traditional discrete manufacturing system, a component or a part gets manufactured in an assembly line. Several assembly lines might be combined to produce the final manufactured part. In order to release the final product, assembly lines may be continuously monitored and optimized so the speed and quality may be improved. Such software manufacturing factory system does not exist for making and running a modern business software application. Moreover, there are no software applications to manage such a system adaptively in a way that it learns continuously from underlying cloud infrastructure as well as other external services to optimize the production of software components. Such a software manufacturing system may be referred to as a modern software factory. Embodiment of the present disclosure provides a management system delivered as a service to create an adaptive software factory from existing resources running in a cloud computing environment for the purpose providing faster and efficient application deployments. Further, the techniques provide methods and systems for managing reliability of applications in the cloud platform for ensuring high-availability. Furthermore, the methods and systems may provide automated recovery of applications in the same region or a different region of the cloud service platform in case of an unexpected event that could lead to potential interruption of services.

The automated application reliability management technique described herein may perform operations normally carried out by a Site Reliability Engineer (SRE) in a much more efficient manner using adaptable machine learning models. An SRE may be required to spend up to 50% of time doing "ops" related work such as issues, on-call, and manual intervention. Since the software system that an SRE oversees is expected to be highly automatic and self-healing, the SRE may spend the other 50% of their time on development tasks such as new features, scaling, or automation. Ideally an SRE may be a highly skilled system administrator with knowledge of code and automation. It may be challenging for an SRE to keep track of the frequent updates occurring at the software development environment side as well as the cloud environment side. Techniques described herein provides for a system and a method that automatically keeps track of the updates happening on both the application development side as well as the cloud environment to manage reliability of the applications running in the cloud environment.

A software development goes through different stages during production including DevTest, Integration, Staging, etc. Developers at the production stage may not be concerned about how the software may actually run using the cloud infrastructure but are mainly concerned about their particular software component of the software. This may be due to the complexities of various cloud services as well as automating them effectively at the speed of the software releases demand.

Further, most of the time, software developers and administrators may be unaware of all the cloud platform resources used by a distributed software application. For example, the distributed software application is a multi-tier application that may be distributed across several compute nodes (e.g., VMs) for execution. For example, there could be several virtual private clouds, elastic load balancers, with several hundred routing tables, security groups, compute instances, elastic storage volumes, virtual private gateways, etc. It becomes challenging to learn and make decisions to deploy new software features and/or patches for a business software application while maintaining highly reliability. Hence, the software assembly lines need to be adaptive to the speed of the software releases as well as continuously changing cloud environments.

Examples described herein may identify cloud components of an application deployed in a cloud service platform and determine relationships between the cloud components of the application. Further, the relationships between the cloud components and other applications running in the cloud platform may be determined to generate a plurality of sub-assemblies. The relationships between the cloud components in a cloud-assembly or sub-assembly and other applications may comprise information related to one or more virtual machines deployed in the cloud, storage, networks, security groups, virtual private gateways, elastic load balancers, Dynamic Host Configuration Protocol (DHCP) configurations, Network Address Translation (NAT) Gateways, subnet configurations, internet gateways, route tables within a virtual private cloud, and the like. Further, the dependencies among the plurality of sub-assemblies may be determined to generate a super-assembly, and an infrastructure as code for the application cloud components of the super-assembly and the plurality of super-assemblies may be generated using metadata of the application cloud components. The dependencies among the sub-assemblies may comprise connectivity information between each of the components of the applications. A management operation may be performed to create a cloud infrastructure of the application using the generated infrastructure as code and its reliability may be verified using an adaptable machine learning model.

Examples described herein may employ machine learning techniques to generate an adaptable machine learning model. The adaptable machine learning model may be created by analysing application logs produced from production stage of applications running in the cloud platform. Further, the adaptable machine learning model may be used to verify the applications for their reliability. Applications may be created via self-healing, migration, cloning, recovery, or the like. The applications may be created in the same cloud environment or a different cloud environment. Further, the applications created in a different cloud environment may include cloud environments operating from a different geographical region.

In the foregoing sections, some features are grouped together in a single embodiment for streamlining the disclosure. This method of disclosure is not to be interpreted as reflecting an intention that the disclosed embodiments of the present disclosure must use more features than are expressly recited in each claim. Rather, as the following claims reflect, inventive subject matter lies in less than all features of a single disclosed embodiment. Thus, the following claims are hereby incorporated into the detailed description, with each claim standing on its own as a separate embodiment.

SYSTEM OVERVIEW AND EXAMPLES OF OPERATION

FIG. 1 is a system view of an example computing platform 100 illustrating a management node 104 to manage reliability of an application in a cloud service platform using an adaptable machine learning model. As shown in FIG. 1, computing platform 100 may include multiple cloud service platforms 102A-N and a management node 104 in communication with the cloud service platforms 102A-N over one or more networks 118. Each of the cloud service platforms 102A-N may include one or more applications running in a one or more VMs and/or containers. Example cloud service platforms 102A-N may be a networked computing environment such as an enterprise computing environment, a cloud computing environment, a virtualized environment, a cross-cloud computing environment, or the like. Further, each the cloud service platforms 102A-N may host software development environments. The application services and the development services may be using one or more VMs and/or containers of the cloud service platforms 102A-N. Each of the cloud service platforms 102A-N may include, but not limited to, physical computing devices, virtual machines, containers, and the like. The virtual machines, in some embodiments, may operate with their own guest operating systems on a physical computing device using resources of the physical computing device virtualized by virtualization software (e.g., a hypervisor, a virtual machine monitor, and the like). A container is a data computer node that runs on top of a host operating system without the need for a hypervisor or separate operating system.

Management node 104 may refer to a computing device or computer program (i.e., executing on a computing device) that provides service to the applications running in the cloud service platforms 102A-N. Further, the management node 104 acts as an intermediator to manage aspects related to the requirements of the application and the services provided by the cloud platform. Cloud service platforms 102A-N and management node 104 may communicate over communication links (e.g., networks 118). Communication is according to a protocol, which may be a message-based protocol.

Example network 118 can be a managed Internet protocol (IP) network administered by a service provider. For example, network 118 may be implemented using wireless protocols and technologies, such as Wi-Fi, WiMAX, and the like. In other examples, network 118 can also be a packet-switched network such as a local area network, wide area network, metropolitan area network, Internet network, or other similar type of network environment. In yet other examples, network 118 may be a fixed wireless network, a wireless local area network (LAN), a wireless wide area network (WAN), a personal area network (PAN), a virtual private network (VPN), intranet or other suitable network system and includes equipment for receiving and transmitting signals. Network 118 can also have a hard-wired connection to cloud service platforms 102A-N.

The management node 104 may include one or more processing resources/processors and memory. Example processor can be custom made or commercially available processor, a central processing unit (CPU), an auxiliary processor, a semiconductor-based microprocessor (in the form of a microchip or chip set, for example), a macro processor, or generally any device for executing computer-readable program code. Example memory may be a computer-readable storage medium. In some examples, memory can have a distributed architecture, where various components are situated remote from one another, but can be accessed by the management node 104. Processors may be configured to execute software stored within associated one of memories, to communicate data to and from the memory, and to generally control operations of applications running in the cloud service platforms 102A-N pursuant to the computer-readable program code. Example non-transitory computer readable medium is an electronic, magnetic, optical, or other physical device or means that can contain or store a computer program for use by or in connection with a computer related system. The computer-readable program code in the non-transitory computer-readable medium may include one or more separate programs and may be in the form of a source program, executable program (object code), script, or any other entity comprising a set of instructions to be performed.

The management node 104 may include an adaptive site reliability automation unit 106 to manage reliability of applications running in the cloud services platforms 102A-N. The primary components of the adaptive site reliability automation unit 106 include a management component 108, an artificial intelligence app recovery and verification component 110, a timeline-based creation/recovery/rollback component 112, a data snapshot lifecycle management component 114, and a journaling configuration management database 116. In operation, the management node 104 uses the adaptive site reliability automation unit 106 to retrieve information related to the cloud service platforms 102A-N connected to the management node 104 and the associated applications running in them via network 118. The retrieved information may be processed at the management node 104 to create an adaptable software factory. The adaptable software factory may include a virtual representation of the applications running in the cloud service platforms 102A-N and the application development services. Cloud components of applications running in the cloud platform and their relationships are identified to generate sub-assemblies which may be compared to a virtual representation of assembly lines in a physical factory. The primary components and their functions are summarized below.

Management component 108 may manage the communication between various components of the adaptive site reliability automation unit 106 and the cloud service platforms 102A-N.

Artificial intelligence app recovery and verification component 110 may receive log streams from production stage of application development environment and analyses the log streams to create an adaptable machine learning model. This machine learning model may be used for verifying the reliability of created applications in the event of a recovery operation.

Timeline based creation/recovery/rollback component 112 may create a cloud infrastructure of an application in the same cloud platform or a different cloud platform. In one example, the application may be created in the same cloud platform if an anomaly is detected in the execution of the application. In such scenario, the application may be redeployed after identifying and correcting the issue that cause the anomaly. Further, prior version of the application which was reliable may also be re-deployed as a rollback. In another example, the application may be deployed in a cloud platform located in a different geographical region in case of a downtime in the primary region.

Data snapshot lifecycle management component 114 may maintain a timeline of data associated with each component of the application over time. The data may include metadata and other data associated to each component of the application. The snapshot of the data may be used for creating the applications. Different versions of data (snapshot) may be stored along with a time stamp associated with each version.

Journaling configuration management database 116 may store data related to each cloud component of the applications and cloud infrastructure configuration details. Acts as a database for the functioning of data snapshot lifecycle management component 114.

Detailed information regarding the working of each of the component is discussed below along with the descriptions of FIGS. 2-8.

Figure 2:
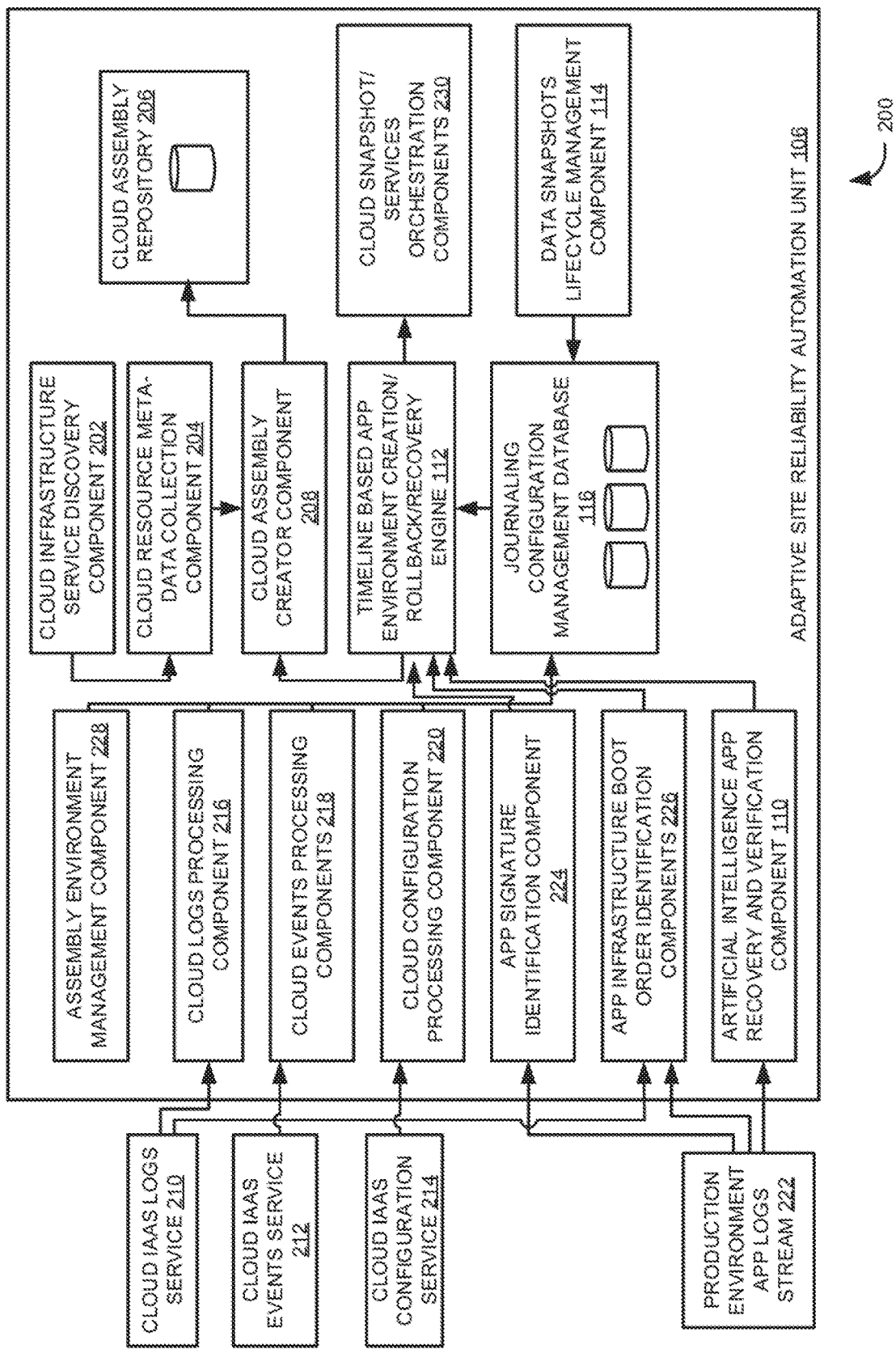
FIG. 2 is a block diagram of an example adaptive site reliability automation unit of FIG. 1.

FIG. 2 is a block diagram 200 of an example adaptive site reliability automation unit 106 of FIG. 1. Adaptive site reliability automation unit 106 includes cloud infrastructure service discovery component 202 that discovers compute services metadata, including but not limited to CPU, memory, storage, private IPs, elastic network Interfaces, elastic storage service type, size, Input Output Processing, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with all the resources running in a cloud region, Network Address Translation (NAT) Gateways, Network Access Control lists, etc., of the cloud service platforms 102A-N. The discovered services metadata may be collected by a cloud resource metadata collection component 204.

A cloud assembly creator component 208 creates cloud assembly which may be made up of a collection of cloud resources discovered by the cloud resource metadata collection component 204. The cloud assemblies are stored as cloud assembly templates in a cloud assembly repository 206. A cloud assembly may be a virtual representation of services, dependencies, external connections, and infrastructure, defined as a code. A cloud assembly encompasses all the cloud infrastructure resources responsible for running software application(s) such as cloud elastic compute, storage, network, security groups, routing tables, virtual private gateways, elastic load balancer configurations, subnets, auto-scaling configurations, storage snapshots, encryption keys, and user defined tags. Multiple such sub-cloud assembly components could be combined into a super-assembly to describe an entire software application environment. Cloud assembly templates may include abstract definitions that specify how cloud resources are created and in which order they are created using cloud infrastructure-as-code. When specific cloud environments are created using the cloud assembly templates, application environment parameters may be given by the users to create instances of the cloud assemblies. Metadata associated with the cloud infrastructure resources and their connectivity and configuration snapshots with timeline may be stored in journaling configuration management database 116. The timeline-based app environment creation/rollback/recovery component 112 creates cloud infrastructure of the applications using the data obtained from the journaling configuration management database 116.

Furthermore, the adaptive site reliability automation unit 106 may allow recovery of entire application environments using timeline-based app environment creation/rollback/recovery component 112 in a cloud platform located at a different geographical region. Timeline based app environment creation/rollback/recovery component 112 takes input from app signature identification component 224, app infrastructure boot order identification components 226 and inputs from artificial intelligence app recovery and verification component 110 to make sure the application environment is created in the right order and verify whether all the known applications are recovered. The reliability of the recovered application environment may be verified using inputs from artificial intelligence app recovery and verification component 110. It may be verified whether the recovered applications are properly running using an adaptable machine learning model.

External services such as cloud Infrastructure as a Service (IaaS) logs service 210, cloud IaaS events service 212, and cloud IaaS configuration service 214 send cloud IaaS resource logs, events and configurations to the journaling configuration management database 116 via cloud logs processing component 216, cloud events processing component 218 and cloud configuration processing component 220 respectively. Production environment app log streams 222 are received by app signature identification component 224, app infrastructure boot order identification component 226, and artificial intelligence app recovery and verification component 110 for analysing application signatures as well as to train an adaptable machine learning model for the subsequent verification of the created/recovered applications.

Further, the environments of the applications in the cloud service platform may be managed using assembly environment management component 228. Information associated with the environments may be determined and stored in the journaling configuration management database 116. Data snapshot lifecycle management component 114 acts on the cloud IaaS metadata, configuration items and connectivity to identify the cloud storage objects and manage their lifecycle for the cloud assembly creator component 208. The cloud snapshots/services orchestration component 230 orchestrates cloud storage snapshots and services to help timeline-based app environment creation/rollback/recovery component 112 to fully recover the application environments with data.

Figure 3:
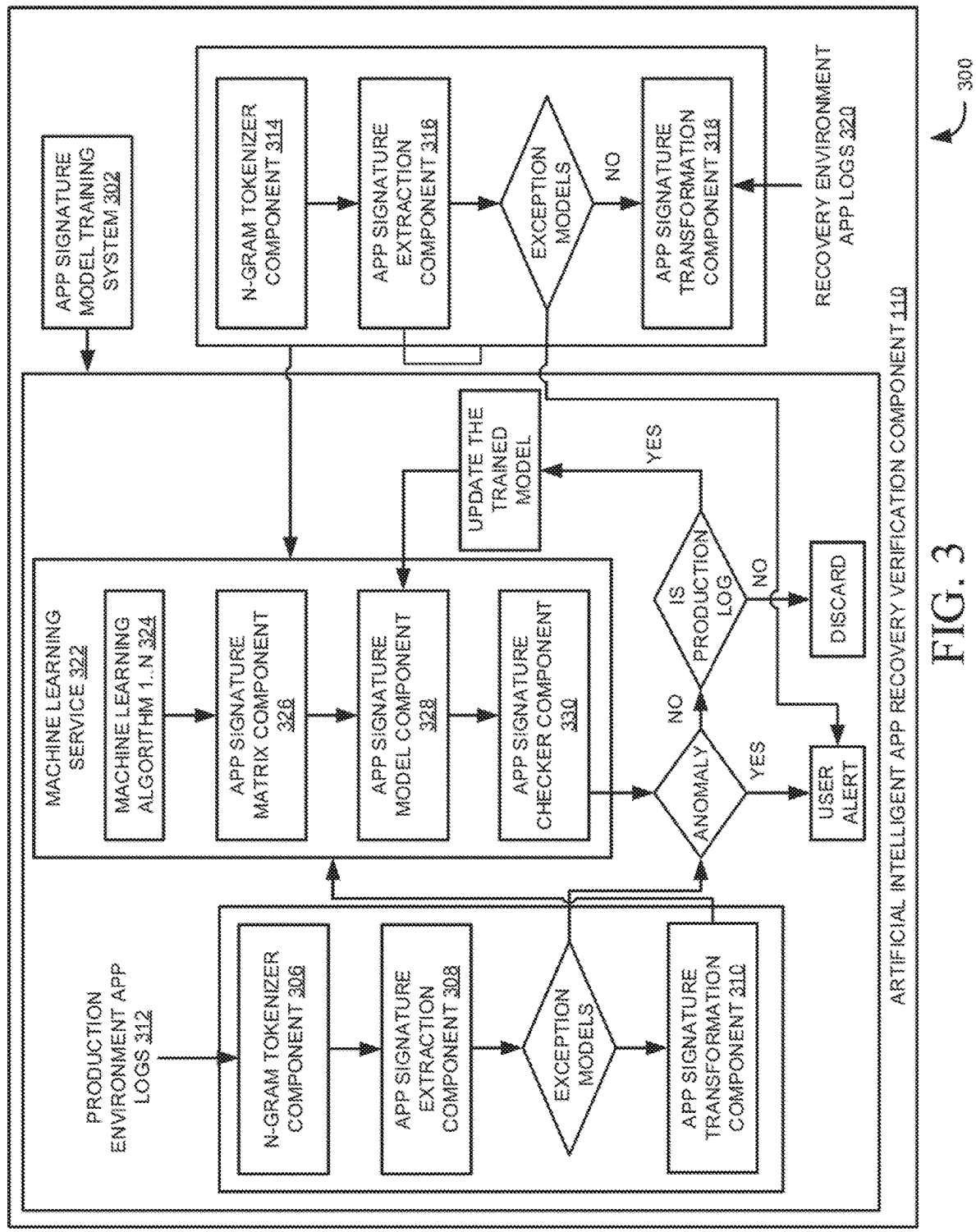
FIG. 3 is a block diagram of an example artificial intelligence app recovery and verification component of FIGS. 1 and 2.

FIG. 3 is a block diagram 300 of an example artificial intelligent app recovery and verification component 110 of FIGS. 1 and 2. The app signature model training system 302 makes use of production environment app logs 312 to train an adaptable machine learning model. The trained adapted machine learning model may be used to test the reliability of the created/recovered applications subsequently. The app signature model training system 302 uses an n-gram tokenizer component 306 to extract n-grams from the application log streams received from the production environment. The log stream may comprise logs specific to each application, component of each of the application, each environment where the application is running, application development environments, each stage of the application development, etc. An app signature extraction component 308 uses the n-grams to extract app specific signatures. If an anomaly is detected at this stage, the user may be alerted. Examples of an anomaly could be a computing system not starting up properly or entire production system logs failing to be sent to the training system and so on. If there is no anomaly, these signatures may be transformed into smaller sets using app signature transformation component 310 over the model training period. An app signature matrix component 326 creates a matrix of signatures for the application log streams. App signature model training system 302 uses the machine learning algorithms 324 to create app signature models and refines the model using the app signature model component 328. Every app signature may be represented in a column of the matrix against the log stream line as a row item. App signatures may be learnt using the model generated by the machine learning service 322.

When the automated application reliability management system recovers or rolls over the applications to a secondary region, recovery environment app logs 320 may be received at the n-gram tokenizer component 314 to get the app signatures transformed using app signature extraction component 316 and app signature transformation component 318. After the app signature model is created for the recovery environment applications, both the production environment app signature model and recovery environment app signature model may be compared by app signature checker component 330 using the adaptable machine learning models to detect any anomalies between the production and recovered systems. If an anomaly is detected after checking existing app signature model with the currently processed model, a user alert may be sent out. If there is no anomaly detected between the two models, app signature model training system 302 may update the trained model with the list of existing models using the cloud machine learning service 322 to continue to converge the system until no further changes occur. App signature model training is fully complete if the app signature models do not change between two updates from the production logs streams. based on the output of the app signature checker component 330, a notification may be sent to the user that the applications are fully recovered. In one example, this technique may be used to detect errors during software update so that decisions could be made to recall a software update or configuration update to the application cloud infrastructure.

Figure 4:
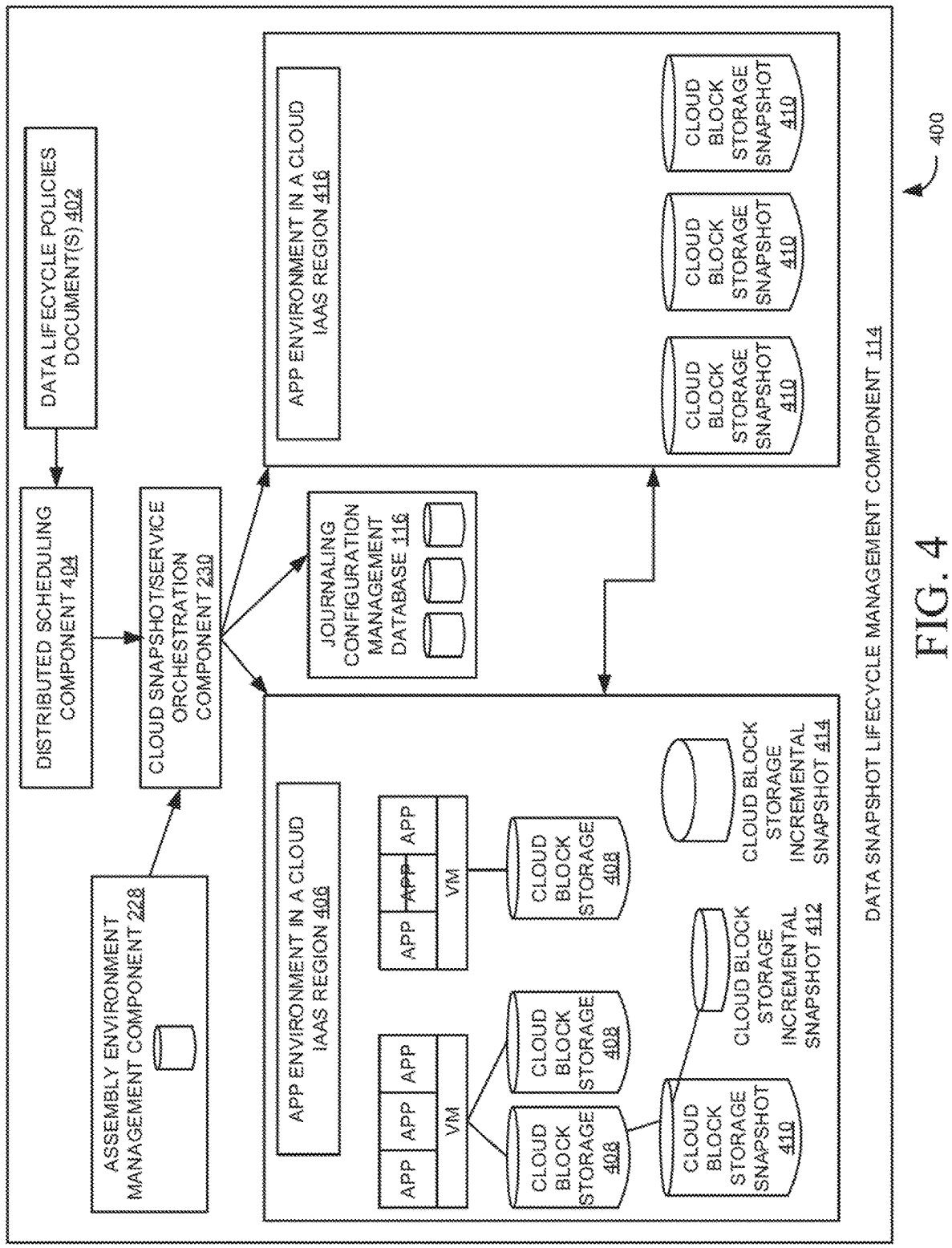
FIG. 4 is a block diagram of an example data snapshot lifecycle management component of FIGS. 1 and 2.

FIG. 4 is a block diagram 400 of an example data snapshot lifecycle management component 114 of FIGS. 1 and 2. Cloud-native data snapshot lifecycle management component 114 maintains a timeline of data associated with each component of the application over time. Herein, a cloud computing tenant organization may describe data lifecycle policies using data lifecycle policies document(s) 402. A tenant organization may be a cloud platform user with specific cloud account(s). Policies may be described based on organizations backup and recovery strategies in simple Yet Another Mark-up Language (YAML) format or via a user interface. A distributed scheduling component 404 uses the data lifecycle policies 402 to schedule orchestration tasks using the snapshot orchestration component 230 which uses assembly environment management component 228 to get details about the cloud assemblies and environments discovered.

Every cloud assembly created from the discovered cloud infrastructure resources in a cloud IaaS region 406 may be analysed to identify the associated cloud block storage 408 attached with the VMs. Cloud assemblies identified with cloud block storage 408 can then be orchestrated by the snapshot orchestration component 230 using cloud an IaaS API to make appropriate calls to create and manage cloud block storage snapshot 410 and cloud block storage incremental snapshots 412. Cloud block storage snapshot 410 may include point in time storage copies. First copy of the snapshot copies the entire data from the computer storage volume to a central cloud object storage system. Subsequent cloud block storage incremental snapshot 414 copies may be incrementally different from the previous point in time copy. For example, if cloud block storage 408 with 100 GB is attached to a VM that runs a database system, the first-time snapshot may be 100 GB copied to the cloud object storage system. Subsequently, if the database system changes the data of 5 GB of the 100 GB, a subsequent cloud block storage incremental snapshot 412 may only have 5 GB copied to the object storage system. It also manages the retention of these snapshots in a second cloud IaaS region. All snapshots managed by the snapshot orchestration component 230 may be used by cloud assembly creator component 208 to create app environments in a cloud IaaS region 416 in the event of migration, cloning, or recovery. All the managed snapshots configurations may be recorded in the journaling configuration management database 116.

Figure 5:
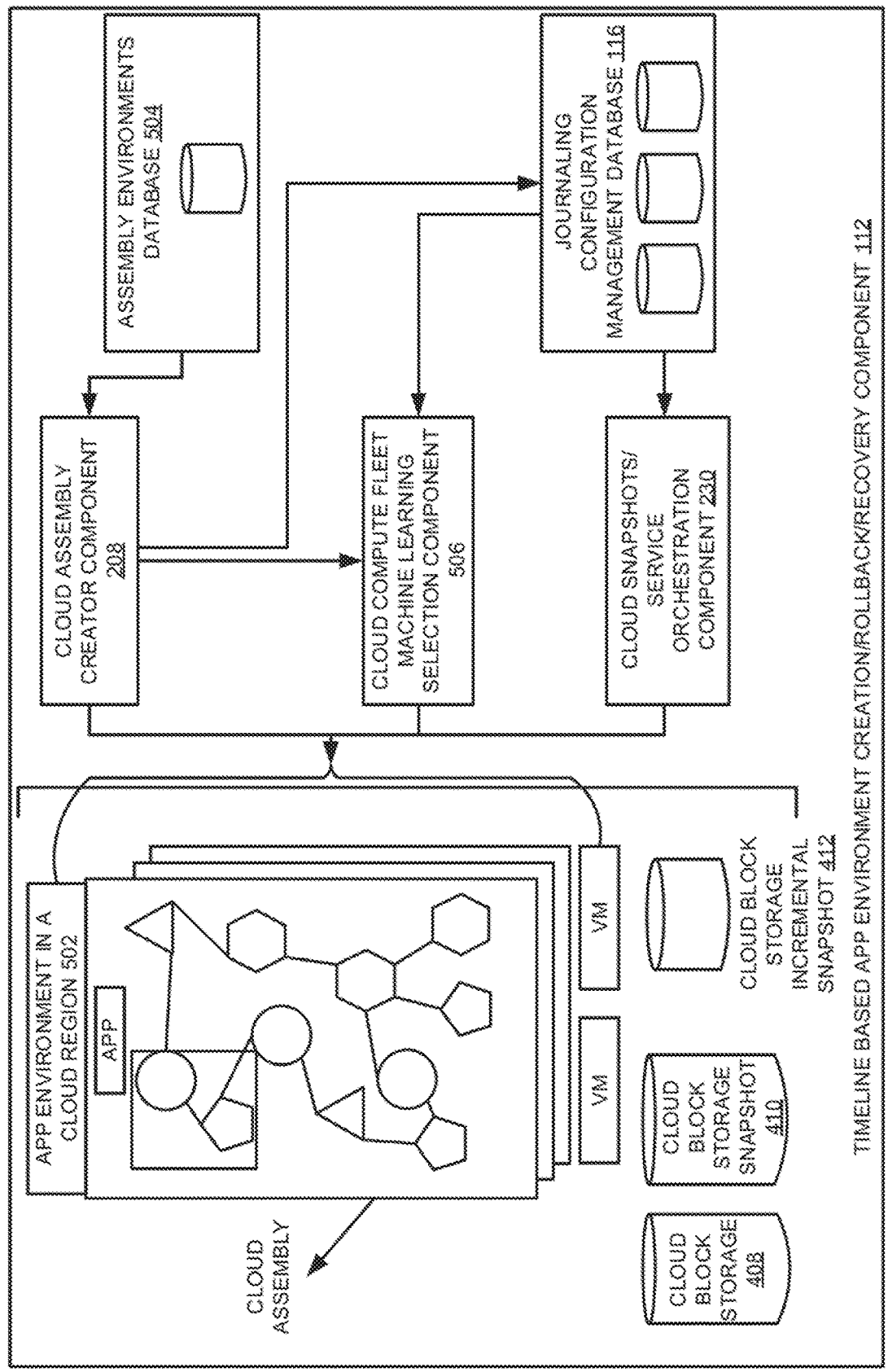
FIG. 5 is a block diagram of an example timeline-based app environment creation/rollback/recovery component of FIGS. 1 and 2.

FIG. 5 is a block diagram 500 of an example timeline-based app environment creation/rollback/recovery component 112 of FIGS. 1 and 2. Herein, a cloud infrastructure of an application may be created in the same cloud platform or a different platform. The application may be created in the same cloud platform if an anomaly is detected in the execution of the application. In such scenario, the application may be redeployed after identifying and correcting the issue that cause the anomaly. Further, prior version of the application which was reliable may also be re-deployed as a rollback operation. Furthermore, the application may be deployed in a cloud platform located in a different geographical location in case of a downtime in the primary region. This cloud assembly creator component 208 may be used to create multiple cloud assemblies representing applications running on a cloud infrastructure. Cloud assemblies may include multiple sub-cloud assemblies to become a super cloud assembly within an app environment in a cloud region 502. There may be multiple such application environments within a cloud region that may be independently created/recovered at the same time.

Cloud assembly creator component 208 uses a cloud compute fleet machine learning selection component 506 to continuously learn from the cloud platform to select appropriate instances available from the cloud region. Most often than not, a particular type of instance coded up in the cloud assembly may not available during creation/recovery. The machine learning selection component 506 allows the system to adapt to a particular region according to the requirement of the business. Cloud assembly creator component 208 in conjunction with assembly environments database 504 and cloud service/snapshot orchestration component 230 makes use of journaling configuration management database 116 to locate user selected point-in-time to rollback or recover an entire app environment in a cloud region 502.

Figure 6:
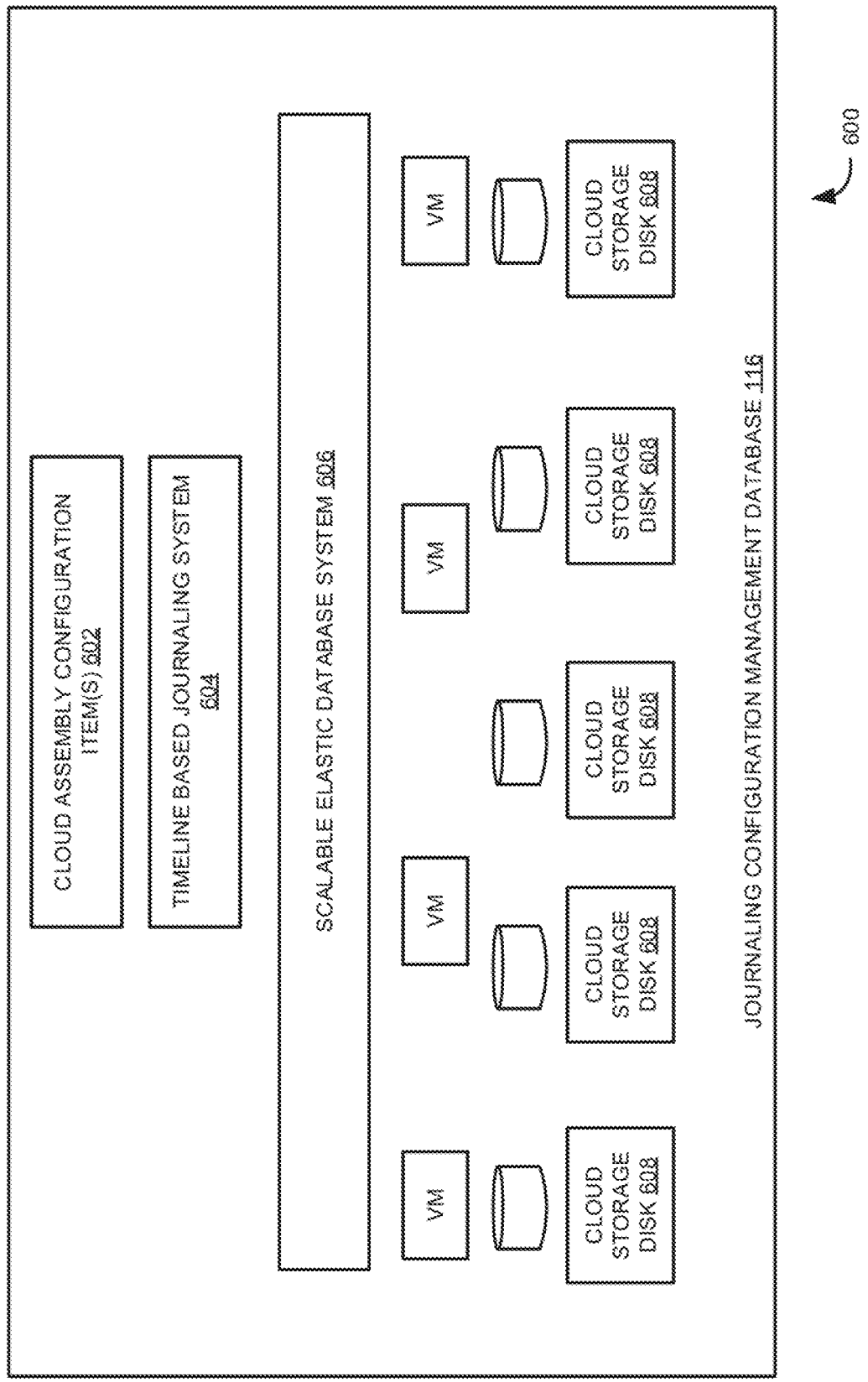
FIG. 6 is a block diagram of an example journaling configuration management database of FIGS. 1 and 2.

FIG. 6 is a block diagram 600 of an example journaling configuration management database 116 of FIG. 1. The journaling configuration management database 116 stores a timeline-based configuration of the infrastructure components with journaling capabilities. All the cloud assembly configuration item(s) 602 gets stored as the cloud assembly creator component 208 works on an existing cloud tenant infrastructure within app environment in a cloud IaaS region. As the cloud configuration items are created a timeline-based journaling system 604 makes journaling entry into scalable elastic database system 606. Data may be stored in the cloud storage disk 608.

Figure 7:
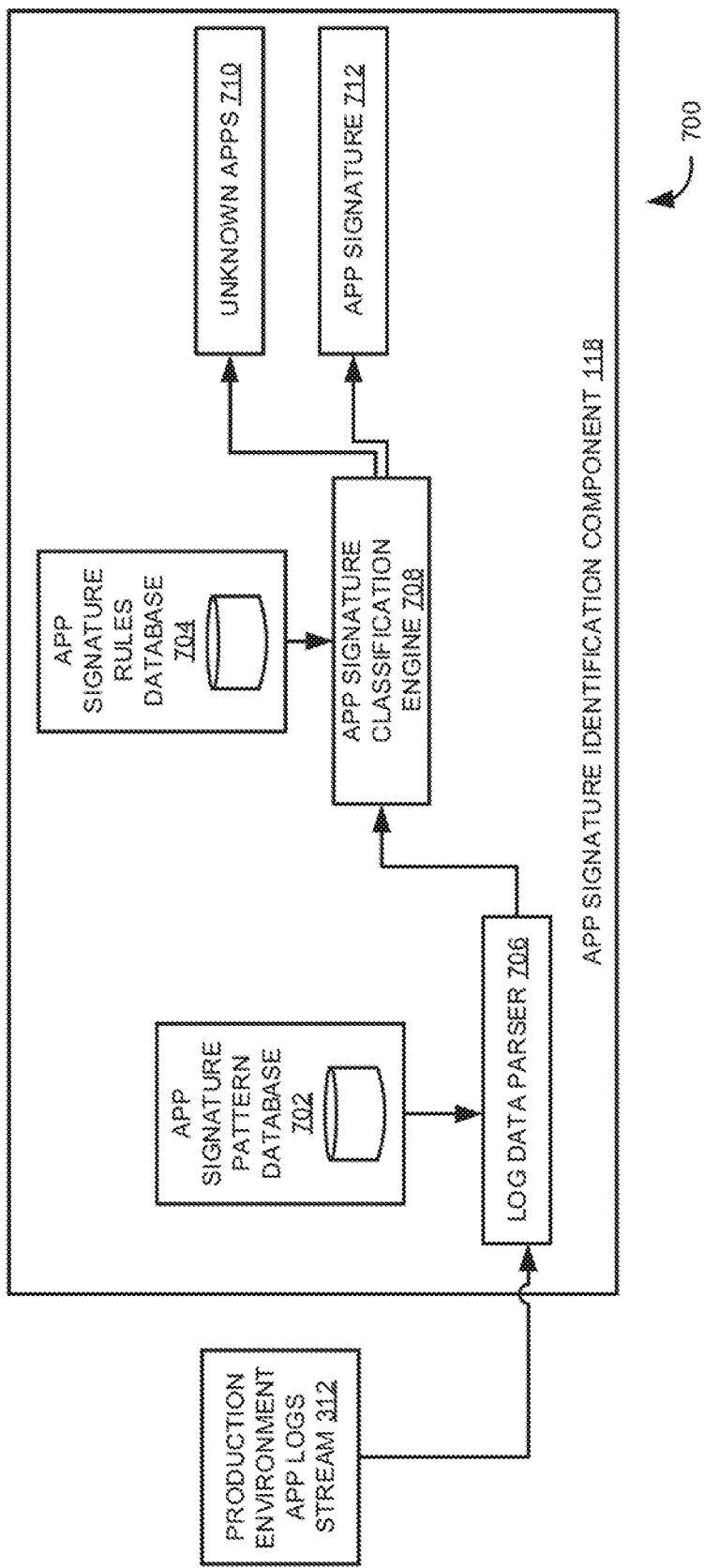
FIG. 7 is a block diagram of an example app signature identification component of FIG. 2.

FIG. 7 is a block diagram 700 of an example app signature identification component 118 of FIG. 3. The app signature identification component 118 uses an app signature classification engine 708 to identify the application signatures based on an app signature pattern database 702 and an app signature rules database 704. A log data parser 706 receives production environment application log streams 312 and inputs from app signature pattern database 702. The log data parser 706 sends its output to the app signature classification engine 708. The output of the app signature classification engine 708 may be a set of application signatures 712 that may be used by the artificial intelligence app recovery and verification component 110 and the timeline-based app environment creation/rollback/recovery component 112. The output may also include unknown apps 710 that may be unrecognized by the app signature classification engine 708.

FIG. 8 is a block diagram 800 of an example app boot order identification component 226 of FIG. 2. Herein platform logs from cloud IaaS logs service 210 and production environment app logs stream 312 are processed by the cloud logs processing component 216 and app log data parser 802 respectively. Further, the processed data may be used by the app boot order decision engine 804 to generate the app boot order 806. A boot order may be a defined list indicating the priority with which the cloud compute systems start. Parsed logs are input to the app boot order decision engine 804 to decide the boot order of the application cloud infrastructure services using data flow directions derived from the logs to decide which one starts first and which service starts next. In some situations, the dataflow could be in both directions between the application cloud components, in which case, the boot order may be set to the same number/priority.

FIG. 9 is an example representation 900 of an app signature used for training and verification of adaptable machine learning models. Every app signature may be represented in a column of the matrix against the log stream line as a row item.

Figure 10:
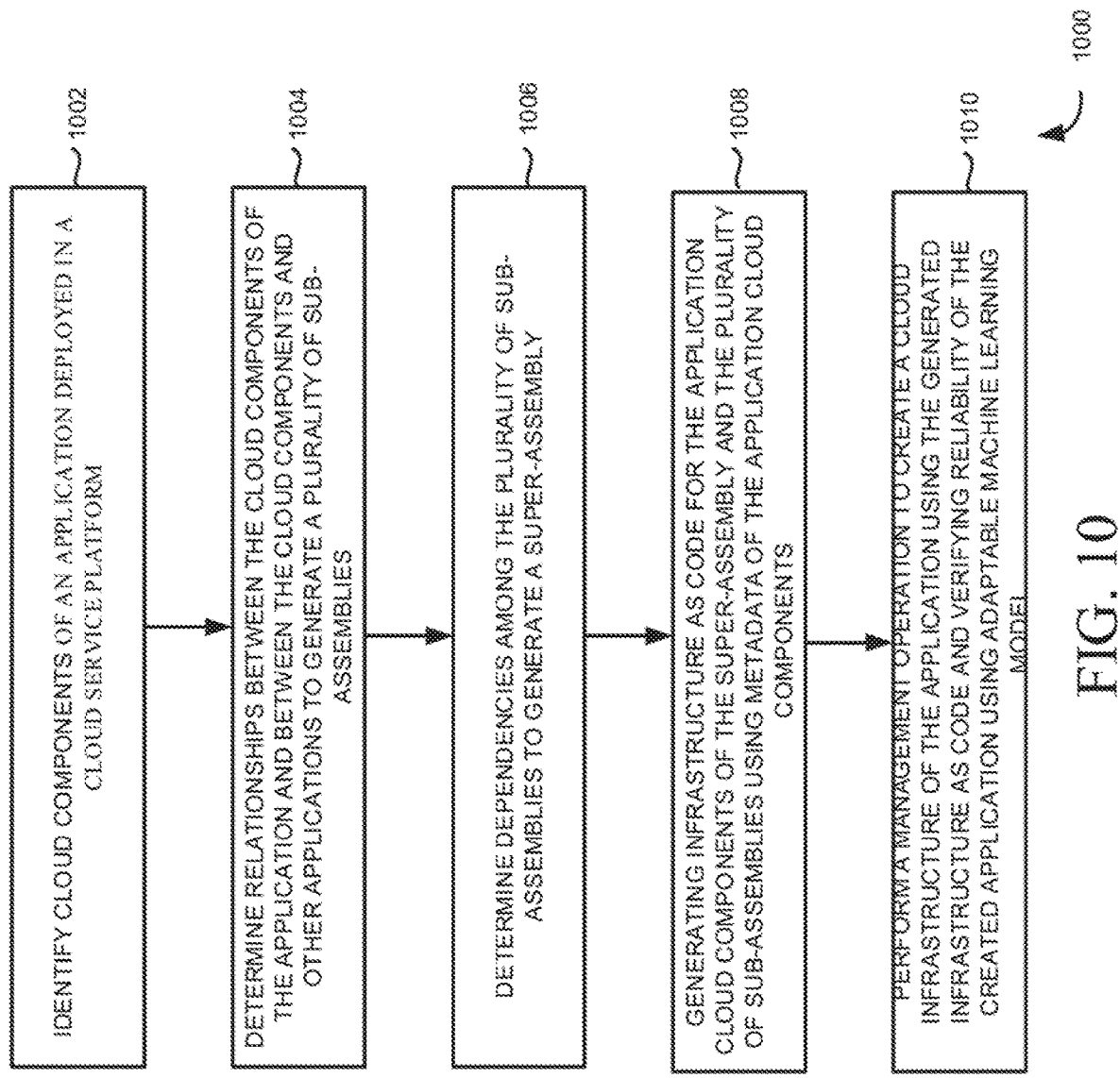
FIG. 10 is an example flow diagram of a method for managing reliability of an application in a cloud service platform using an adaptable machine learning model.

FIG. 10 is an example flow diagram 1000 of a method for managing reliability of an application in a cloud service platform using an adaptable machine learning model. The process depicted in FIG. 10 represents generalized illustrations, and that other processes may be added, or existing processes may be removed, modified, or rearranged without departing from the scope and spirit of the present application. In addition, the processes may represent instructions stored on a computer-readable storage medium that, when executed, may cause a processor to respond, to perform actions, to change states, and/or to make decisions. Alternatively, the processes may represent functions and/or actions, to change states, and/or to make decisions. Alternatively, the processes may represent functions and/or actions performed by functionally equivalent circuits like analog circuits, digital signal processing circuits, application specific integrated circuits (ASICs), or other hardware components associated with the system. Furthermore, the flow charts are not intended to limit the implementation of the present application, but rather the flowcharts illustrate functional information to design/fabricate circuits, generate programs, or use a combination of hardware and program to perform the illustrated processes.

At 1002, cloud components of an application deployed in a cloud service platform may be identified. In one example, cloud components are identified from a staging environment or a production environment of the application's development environment. The applications may run on virtual machines or containers.

At 1004, relationships between the identified cloud components may be determined. Further, relationships between the cloud component and other applications are determined. The determined relationships may be used to generate a plurality of sub-assemblies. The sub-assemblies may represent components of an application including its relationships with other components, other applications, and with the cloud infrastructure. In one example, the relationships between the cloud components and between the cloud components and other applications may include information related to one or more virtual machines deployed in the cloud, a storage, networks, security groups, virtual private gateways, elastic load balancers, DHCP configurations, NAT Gateways, subnet configurations, internet gateways and/or route tables within a virtual private cloud.

At 1006, dependencies among the plurality of sub-assemblies may be determined to generate a super-assembly. At 1008, an Infrastructure as Code for the application cloud components of the super-assembly and the plurality of sub-assemblies may be generated using metadata of the application cloud components. In one example, the dependencies among the sub-assemblies may include connectivity information between cloud components of the sub-assemblies.

Example metadata associated with the application cloud components of the sub-assemblies and super-assembly may include information selected from the group consisting of a processor, memory, storage, private IPs, elastic network Interfaces, elastic storage service types, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with resources running in a cloud region, NAT Gateways, and Network Access Control lists. Further, the metadata may be dynamically updated based on the changes to the application cloud components, changes in cloud infrastructure, changes in cloud infrastructure, and the like.

At 1010, management operations may be performed using the generated Infrastructure as Code. The management operation may include creating a cloud infrastructure of the application. Further, using an adaptable machine learning model, the reliability of the created application may be verified. In one example, the cloud infrastructure of the application is created in a cloud region different from the cloud service platform.

Figure 11:
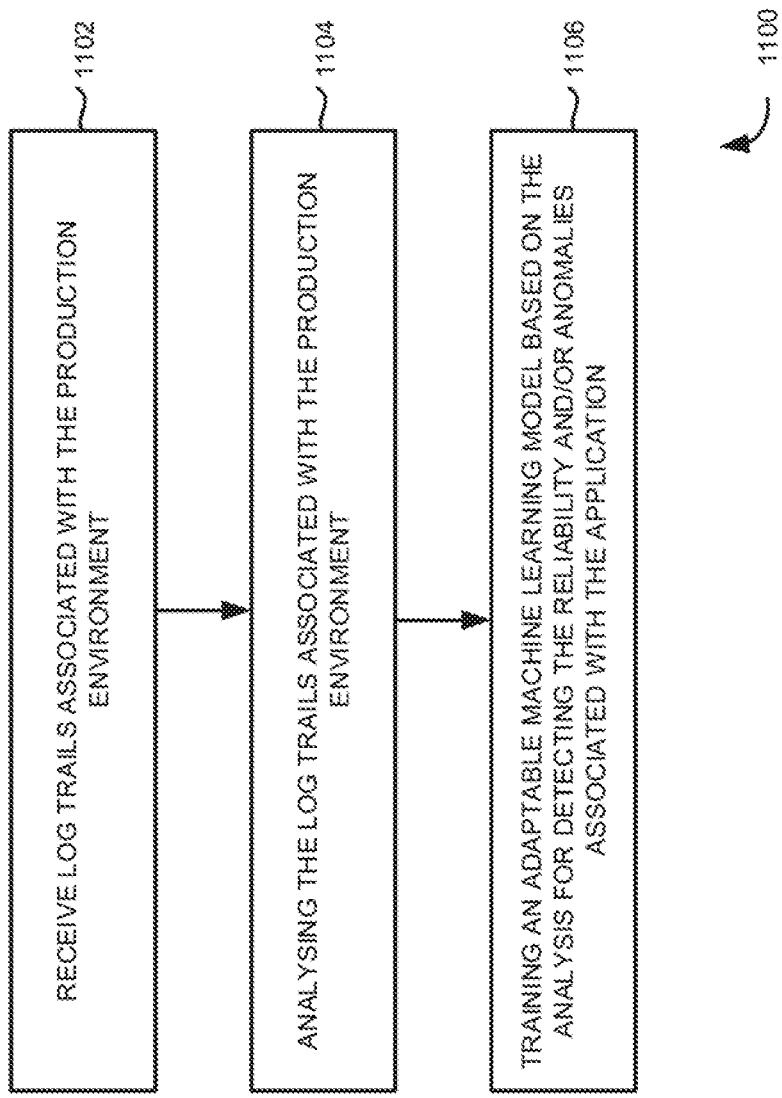
FIG. 11 is an example flow diagram of a method for training an adaptable machine learning model.

FIG. 11 is an example flow diagram 1100 of a method for training an adaptable machine learning model. At 1102, log trails associated with the production environment of the application may be received. At 1104, the received log trails associated with the production environment of the application may be analysed. At 1106, a machine learning model may be trained based on the analysis of the log trails for detecting reliability and/or anomalies associated with the application. The machine learning model so trained may be an adaptable model which learn continuously by analysing the log trails and different scenarios associated with the application and the cloud environment.

Figure 12:
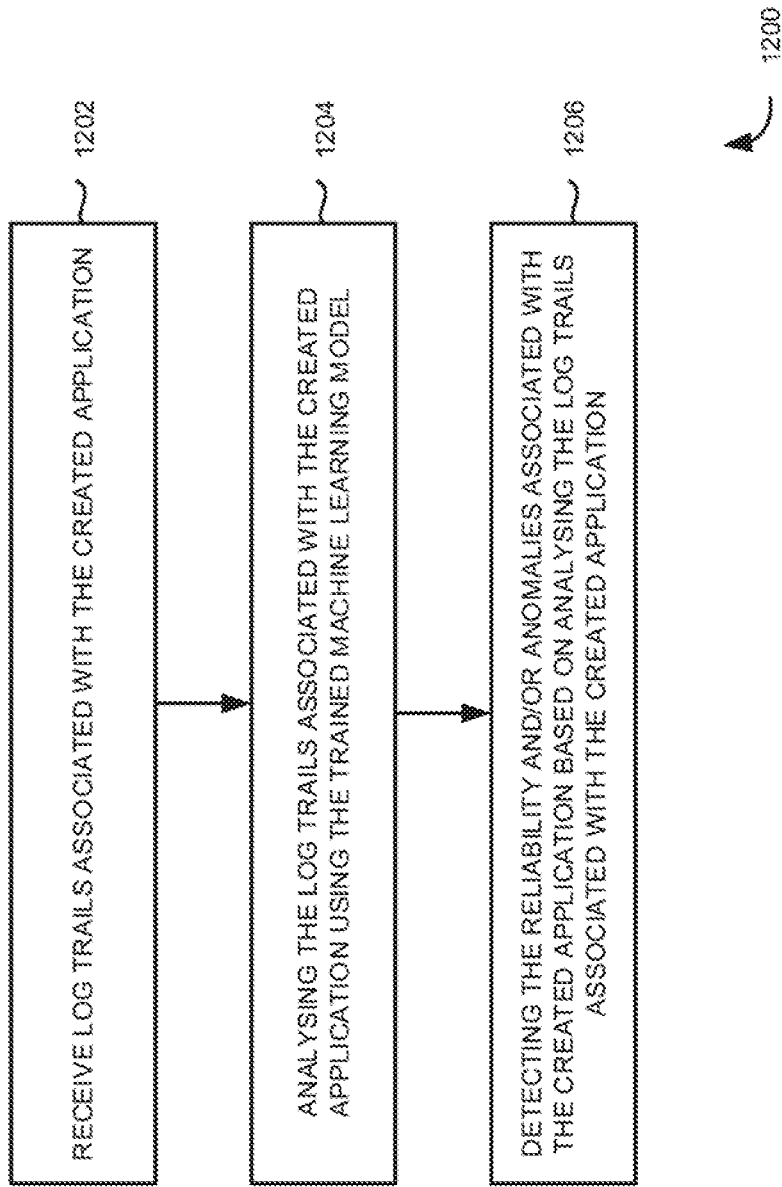
FIG. 12 is an example flow diagram for a method for using the machine learning model to detect reliability of applications.

FIG. 12 is an example flow diagram 1200 of a method for using machine learning models to detect reliability of recovered applications. At 1202, log trails associated with the created application may be received. The log trails may be received from a recovery environment within the same cloud platform or a different cloud platform. The different cloud platform may also be situated in a different geographical region. At 1204, the log trails associated with the created application may be analysed using the machine learning model. The machine learning model may be a pre-trained machine learning models or an adaptable machine learning model created based on logs collected from production environments. At 1206, the reliability and/or anomalies associated with the created application may be detected based on the analysis. Further, a notification may be generated on detecting an anomaly during execution of the created application.

Figure 13:
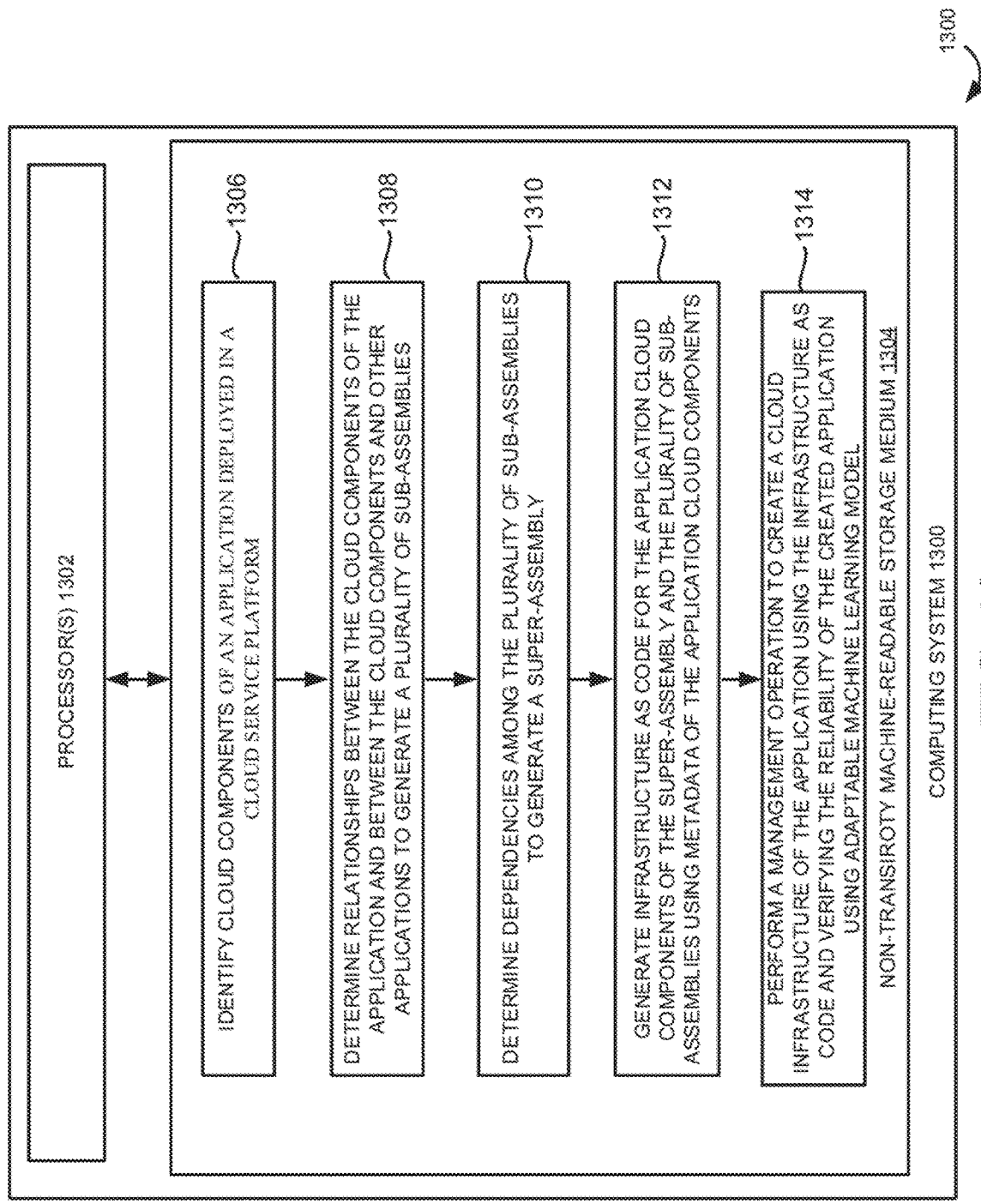
FIG. 13 is a block diagram of an example machine-readable storage medium storing instructions for managing reliability of applications in a cloud platform.

FIG. 13 is a block diagram of an example system including instructions stored in a machine-readable storage medium 1304 for managing reliability of applications in a cloud platform using adaptable machine learning model. The computing system 1300 may include a processor 1302 and a machine-readable storage medium 1304 communicatively coupled through a system bus. The processor 1302 may be any type of central processing unit (CPU), microprocessor, or processing logic that interprets and executes machine-readable instructions stored in the machine-readable storage medium 1304. The machine-readable storage medium 1304 may be a random-access memory (RAM) or another type of dynamic storage device that may store information and machine-readable instructions that may be executed by the processor 1302. For example, the machine-readable storage medium 1304 may be synchronous DRAM (SDRAM), double data rate (DDR), Rambus® DRAM (RDRAM), Rambus® RAM, etc., or storage memory media such as a floppy disk, a hard disk, a CD-ROM, a DVD, a pen drive, and the like. In an example, the machine-readable storage medium 1304 may be a non-transitory machine-readable medium. In an example, the machine-readable storage medium 1304 may be remote but accessible to computing system 1300.

The machine-readable storage medium 1304 may store instructions 1306-1314. In an example, instructions 1306-1314 may be executed by processor 1302 for managing reliability of an application in a cloud service platform. Instructions 1306 may be executed by processor 1302 to identify cloud components of an application deployed in a cloud service platform. Instructions 1308 may be executed by processor 1302 to determine relationships between the cloud components of the application and between the cloud components and other applications to generate a plurality of sub-assemblies. Instructions 1310 may be executed by processor 1302 to determine dependencies among the plurality of sub-assemblies to generate a super-assembly. Instructions 1312 may be executed by processor 1302 to generate infrastructure as code for the application cloud components of the super-assembly and the plurality of sub-assemblies using metadata of the application cloud components. Instructions 1314 may be executed by processor 1302 to perform a management operation to create a cloud infrastructure of the application using the generated infrastructure as code and verify the reliability of the created application using an adaptable machine learning model.

Some or all of the system components and/or data structures may also be stored as contents (e.g., as executable or other machine-readable software instructions or structured data) on a non-transitory computer-readable medium (e.g., as a hard disk; a computer memory; a computer network or cellular wireless network or other data transmission medium; or a portable media article to be read by an appropriate drive or via an appropriate connection, such as a DVD or flash memory device) so as to enable or configure the computer-readable medium and/or one or more host computing systems or devices to execute or otherwise use or provide the contents to perform at least some of the described techniques. Some or all of the components and/or data structures may be stored on tangible, non-transitory storage mediums. Some or all of the system components and data structures may also be provided as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

The techniques described herein may automatically deploy the application environment at a different cloud region on detecting an event which could cause downtime. In one example, for applications hosted in cloud service platforms residing in regions which are prone to natural disasters like cyclones, the system may automatically deploy the whole application environment in a cloud platform hosted in a different (safer) region. Hence, any potential downtime is avoided by the automated reliability management system. Moreover, the system verifies that the application now running in a different region is functioning properly using the artificial intelligence techniques (adaptable machine learning models) described herein. Furthermore, the system is capable of self-healing in the event of any reliability issues. The timeline-based rollback mechanism along with the journaling database ensures that the application and related services are automatically re-deployed in case of any reliability issues which may be caused by a malfunctioning update, a patch, a bug, unexpected hardware issues, power failure, unavailability of resources, and the like.

It may be noted that the above-described examples of the present solution are for the purpose of illustration only. Although the solution has been described in conjunction with a specific embodiment thereof, numerous modifications may be possible without materially departing from the teachings and advantages of the subject matter described herein. Other substitutions, modifications and changes may be made without departing from the spirit of the present solution. All the features disclosed in this specification (including any accompanying claims, abstract and drawings), and/or all of the steps of any method or process so disclosed, may be combined in any combination, except combinations where at least some of such features and/or steps are mutually exclusive.

The terms "include," "have," and variations thereof, as used herein, have the same meaning as the term "comprise" or appropriate variation thereof. Furthermore, the term "based on", as used herein, means "based at least in part on." Thus, a feature that is described as based on some stimulus can be based on the stimulus or a combination of stimuli including the stimulus.

The present description has been shown and described with reference to the foregoing examples. It is understood, however, that other forms, details, and examples can be made without departing from the spirit and scope of the present subject matter that is defined in the following claims.

The invention claimed is:

1. A computer-implemented method, comprising:
identifying cloud services of a distributed software system deployed in a cloud platform, wherein the distributed software system is a multi-tier distributed across multiple compute nodes for execution;
determining relationships between the cloud services of the distributed software system and between the cloud services and other distributed software systems in the cloud platform to generate a plurality of sub-assemblies;
determining dependencies among the plurality of sub-assemblies to generate a super-assembly;
generating cloud platform specific infrastructure as code for the distributed software system based on the cloud services of the super-assembly and metadata of the cloud services of the super-assembly; and
performing a management operation to create a cloud infrastructure of the distributed software system using the generated cloud platform specific infrastructure as code and verifying reliability of the created distributed software system using an adaptable machine learning model.

2. The computer-implemented method of claim 1, wherein the management operation comprises at least one of: recovery, self-healing, migration, and cloning of the distributed software system.

3. The computer-implemented method of claim 1, wherein the cloud services are identified from a staging environment or a production environment of the distributed software system's development environment.

4. The computer-implemented method of claim 3, further comprising:
receiving log trails associated with the production environment;
analyzing the log trails associated with the production environment; and
training the adaptable machine learning model based on the analysis for detecting the reliability and/or anomalies associated with the distributed software system.

5. The computer-implemented method of claim 4, wherein verifying the reliability of the created distributed software system comprises:
receiving log trails associated with the created distributed software system;
analyzing the log trails associated with the created distributed software system using the trained adaptable machine learning model; and
detecting the reliability and/or the anomalies associated with the created distributed software system based on analyzing the log trails associated with the created distributed software system.

6. The computer-implemented method of claim 5, further comprising: generating a notification on detecting an anomaly during execution of the created distributed software system.

7. The computer-implemented method of claim 1, wherein the cloud infrastructure of the distributed software system is created in a cloud region different from the cloud platform.

8. The computer-implemented method of claim 1, wherein the metadata associated with the cloud services of the super-assembly and the plurality of sub-assemblies comprises information selected from the group consisting of a processor, memory, storage, private IPs, elastic network Interfaces, elastic storage service types, encryption and encryption key management key IDs, security groups, routing table configurations, virtual private cloud resources, virtual private cloud peering, elastic load balancer configurations, auto-scaling groups, subnets, domain naming service configurations, object storage buckets and configurations, tags associated with resources running in a cloud region, Network Address Translation (NAT) Gateways, and Network Access Control lists.

9. The computer-implemented method of claim 1, wherein the relationships between the cloud services and between the cloud services and other distributed software systems comprise information related to one or more virtual machines deployed in the cloud, storage, networks, security groups, virtual private gateways, elastic load balancers, Dynamic Host Configuration Protocol configurations, NAT Gateways, subnet configurations, internet gateways and/or route tables within a virtual private cloud.

10. The computer-implemented method of claim 1, wherein the dependencies among the sub-assemblies comprise connectivity information between cloud services of the sub-assemblies.

11. The computer-implemented method of claim 1, wherein the distributed software systems are running on several virtual machines or containers.

12. A system comprising:
a management node connected to one or more cloud platforms via a network, wherein the management node comprises an adaptive site reliability automation unit residing in memory and executable by a processor to:
identify cloud services of a distributed software system deployed in a cloud region of a cloud platform, wherein the distributed software system is a multi-tier distributed across multiple compute nodes for execution;
determine relationships between the cloud services of the distributed software system and between the cloud services and other distributed software systems to generate a plurality of sub-assemblies;
determine dependencies among the plurality of sub-assemblies to generate a super-assembly;

generate cloud platform specific infrastructure as code for the distributed software system based on the cloud services of the super-assembly and metadata of the cloud services of the super-assembly; and
perform a management operation to create a cloud infrastructure of the distributed software system using the generated cloud platform specific infrastructure as code in the same cloud region or in a different cloud region of the cloud platform or in a different cloud platform and verifying the reliability of the created distributed software system using an adaptable machine learning model.

13. The system of claim 12, wherein the management operation comprises at least one of: recovery, self-healing, migration, and cloning of the distributed software system and associated cloud infrastructure services and point-in-time data.

14. The system of claim 12, further comprising an artificial intelligence app recovery and verification component to:
receive log trails associated with a production environment of the distributed software system's development environment;
analyze the log trails associated with the production environment; and
training the adaptable machine learning model based on the analysis for detecting the reliability and/or anomalies associated with the distributed software system.

15. The system of claim 14, wherein the artificial intelligence app recovery and verification component is further configured to:
receive log trails associated with the created distributed software system:
analyze the log trails associated With the created distributed software system using the trained adaptable machine learning model; and
detect the reliability and/or the anomalies associated with the created distributed software system based on analyzing the log trails associated with the created distributed software system.

16. The system of claim 12, further comprising a timeline-based creation/recovery/rollback component to: create the cloud infrastructure of the distributed software system in a cloud region different from the cloud platform.

17. A non-transitory machine-readable medium storing instructions executable by a processing resource to:
identify cloud services of a distributed software system deployed in a cloud platform, wherein the distributed software system is a multi-tier distributed across multiple compute nodes for execution;
determine relationships between the cloud services of the distributed software system and between the cloud services and other distributed software systems applications to generate a plurality of sub-assemblies;
determine dependencies among the plurality of sub-assemblies to generate a super-assembly;
generate cloud platform specific infrastructure as code for the distributed software system based on the cloud services of the super-assembly and metadata of the cloud services of the super-assembly; and
perform a management operation to create a cloud infrastructure of the distributed software system using the generated cloud platform specific infrastructure as code and verifying, the reliability of the created distributed software system using an adaptable machine learning, model.

18. The non-transitory machine-readable medium of claim 17, wherein the management operation comprises at least one of: recovery, self-healing, migration, and cloning of the distributed software system.

19. The non-transitory machine-readable medium of claim 17, further comprising instructions to:
- receive log trails associated with a production environment of the distributed software system's development environment;
- analyze the log trails associated with the production environment; and
- train the adaptable machine learning model based on the analysis for detecting the reliability and/or anomalies associated with the distributed software system.

20. The non-transitory machine-readable medium of claim 19, further comprising instructions to:
- receive log trails associated with the created distributed software system;
- analyze the log trails associated with the created distributed software system using the trained adaptable machine learning model; and
- detect the reliability and/or the anomalies associated with the created distributed software system based on analyzing the log trails associated with the created distributed software system.

* * * * *